Figure 1:
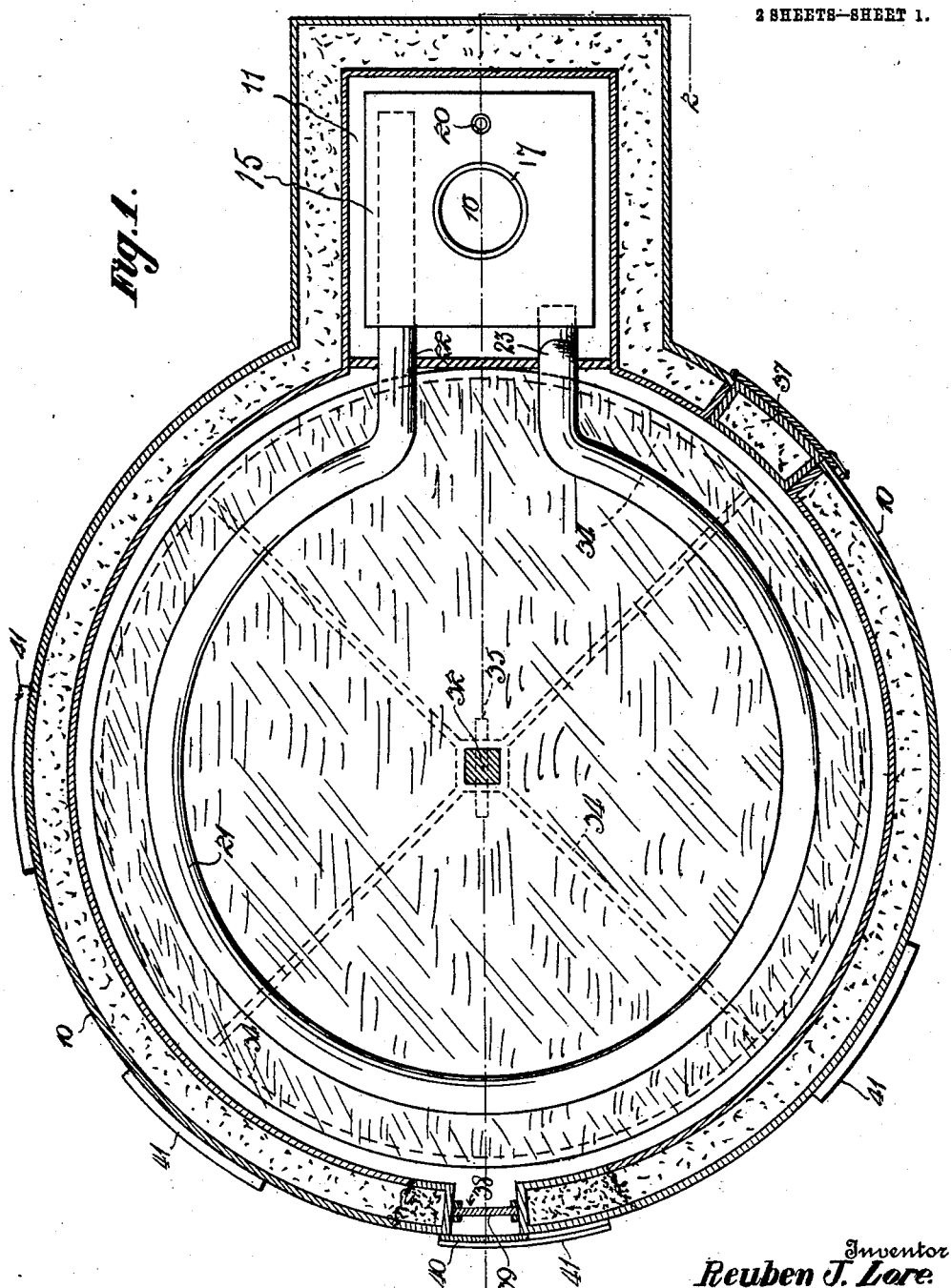

R. J. LORE.
BROODER.
APPLICATION FILED NOV. 11, 1909.

969,710.

Patented Sept. 6, 1910.
2 SHEETS—SHEET 1.

Witnesses
C. C. Chandlee.
C. N. Woodward.

Inventor
Reuben J. Lore.
By
Attorneys

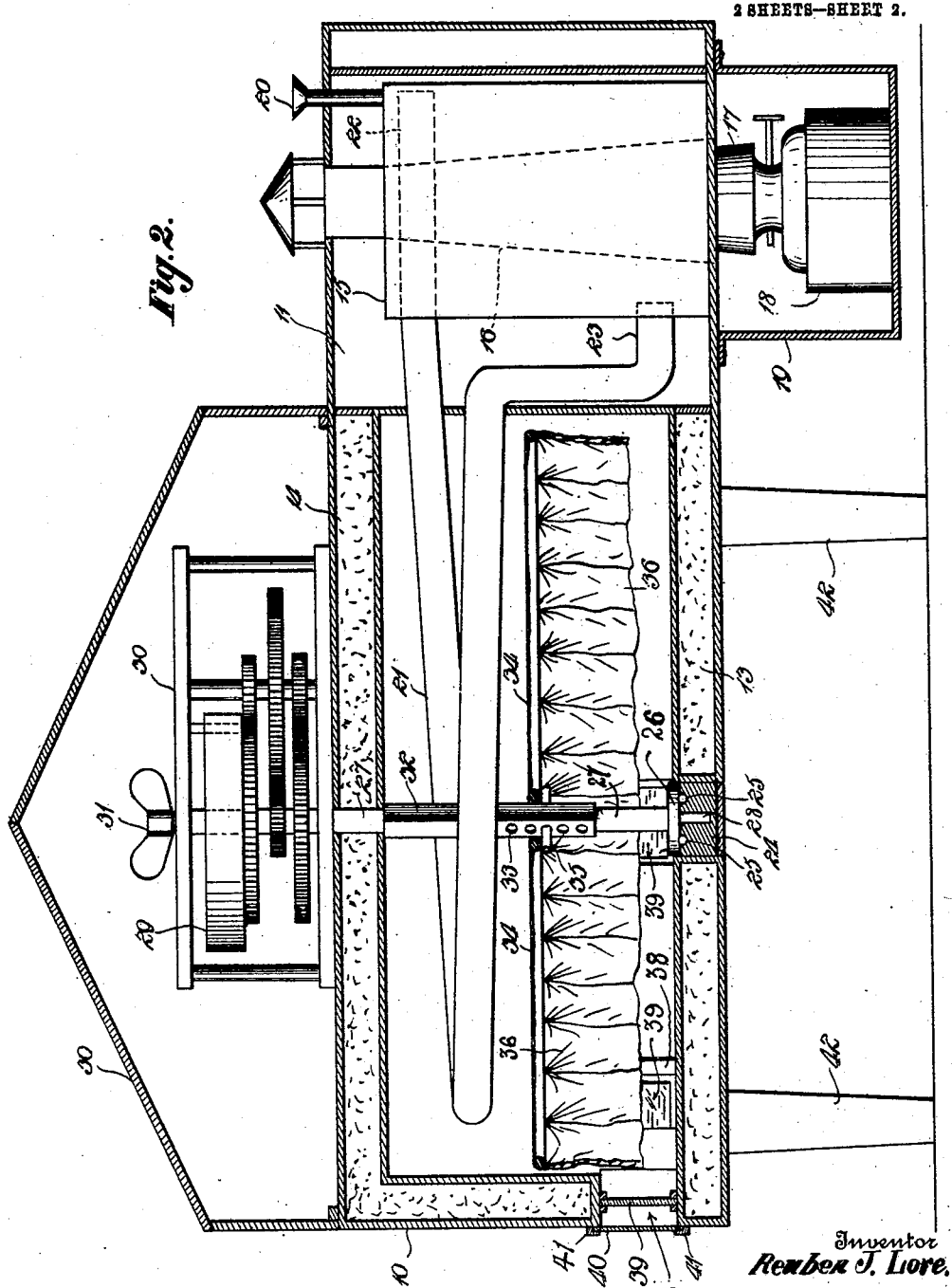

UNITED STATES PATENT OFFICE.

REUBEN J. LORE, OF CLARKSVILLE, IOWA.

BROODER.

969,710.  Specification of Letters Patent.  Patented Sept. 6, 1910.

Application filed November 11, 1909. Serial No. 527,538.

*To all whom it may concern:*

Be it known that I, REUBEN J. LORE, a citizen of the United States, residing at Clarksville, in the county of Butler, State of Iowa, have invented certain new and useful Improvements in Brooders; and I do hereby declare the following to be a full, clear, and exact description of the invention, such as will enable others skilled in the art to which it appertains to make and use the same.

This invention relates to poultry brooders, and has for one of its objects to improve the construction and increase the efficiency and utility of devices of this character.

Another object of the invention is to provide a simply constructed device of this character wherein provision is made for preventing the young chicks from crowding one upon the other and thus injuring or destroying each other.

With these and other objects in view, the invention consists in certain novel features of construction as hereafter shown and described and then specifically pointed out in the claims; and, in the drawings illustrative of the preferred embodiment of the invention, Figure 1 is a plan view of the improved device in section through the upper portion of the inclosing casing. Fig. 2 is a section on the line 2—2 of Fig. 1.

The improved device comprises an inclosing casing, preferably circular as shown in Fig. 1, and provided with a closed chamber at one side, the chamber designed to contain the heating medium.

When the improved device is located within a building or a room where the casing is protected from the elements, the casing may be formed with single walls, but when the improved device is located out of doors or where exposed to the elements the walls will preferably be double, or with non-conducting filling material, and likewise provided with a protecting roof or housing. When employed out of doors also the casing will preferably be mounted upon suitable legs or supports to maintain them spaced from the ground for obvious reasons.

It is not desired to limit the invention to any specific form of casing or housing, but for the purpose of illustration the improved device is shown constructed for use out of doors, and to this end the walls of the casing 10 are shown double and provided with a suitable filling material, and the chamber 11 for the heat imparting medium, is also shown with double walls of the same character. The main casing 10 is also provided with a double bottom 13 and a double top 14, of the usual construction. The heating medium employed in the improved device is preferably hot water, and the water is contained in a reservoir 15 located in the chamber 11 and formed with a central vertical opening 16 into which the chimney portion 17 of a lamp 18 is projected, as shown in Fig. 2, the lamp being in turn supported in a suitable casing 19 suspended beneath the chamber 11, as shown. A filling spout 20 is provided to enable the reservoir 15 to be filled. Located within the casing 10 near its upper part is a coiled pipe 21 having one terminal 22 extending into the reservoir 15, preferably near the top, and the other terminal 23 leading into the reservoir near the bottom. By this arrangement it will be obvious that as the water in the reservoir is heated by the lamp, the water will continuously circulate through the pipe 21, and thus maintain a uniform heat within the casing or hover chamber 10.

Located in the bottom 13 of the casing is a shaft step 24 having a plurality of bearing balls 25 upon which a flange 26 on a shaft 27 rotates, the shaft being also stepped at 28 in the step 24. The shaft 27 extends upwardly through the top 14 of the casing, and is provided at its upper end with a suitable spring motor, represented conventionally at 29, the motor thus exerting its force to slowly rotate the shaft 27. The motor 29 is protected by a suitable housing 30, which is arranged to be readily detached when the motor is to be wound by its key 31. The intermediate portion of the shaft 27 is preferably formed square as shown at 32 and provided with a plurality of transverse apertures 33. Adjustably supported upon this square portion of the shaft is a frame 34, the frame being preferably formed of wire, as shown, and adjustably coupled to the shaft by a pin 35 extended through one of the apertures 33. By this means it will be obvious that the frame 34 may be readily adjusted upon the shaft within the range of the apertures 33. The frame 34 supports the "artificial mother" elements which are usually formed of strips of woolen cloth 36, and are suspended from the frame 34. The frame 34 will be adjusted so that the lower terminals of the strips 36 are located at the requisite distance above the floor 13 of the casing to adapt the mother element to the sizes of the chicks, and as the chicks grow the frame may be adjusted to suit the growth of the chicks. The frame 34, it will be noted, is so connected that it partakes of the movement of the shaft 27, and thus maintains the members 36 in constant and continuous slow motion over the backs of the chicks, and thus effectually prevent them from attempting to climb one upon the other while seeking warmer positions. The constantly rotating elements 36 thus effectually protect the weaker chicks, and render the conditions uniform throughout the whole interior of the casing. A door 37 is formed in one side of the casing 10 to permit the ready cleansing of the casing, and a plurality of observation openings 38 are also arranged in the sides of the casing at suitable intervals; each opening being provided with a transparent closure, preferably glass, as shown at 39, and each opening also provided with a closure 40 slidably arranged in suitable guideways 41, as shown. By this means the condition of the young chicks may be observed as often as necessary. The casing 10 is shown mounted upon suitable legs 42, to maintain the casing at the requisite distance above the ground.

The improved device may be constructed of any suitable material, and with a hover chamber of any required size, and arranged for location in a building or out of doors, as may be preferred.

What is claimed is:—

1. In a brooder the combination of a hover chamber, hover members located in said chamber, and means for continuously moving said hover members.

2. In a brooder the combination of a hover chamber, hover members within said chamber, and means for continuously rotating said hover members.

3. In a brooder the combination of a hover chamber, a frame movably arranged in said chamber, a plurality of hover members depending from said frame, and means for imparting movement continuously to said frame.

4. In a brooder the combination of a hover member, hover members located in said chamber, means for continuously moving said hover members, and a heating medium located in said chamber.

5. In a brooder, a hover chamber, a shaft mounted for rotation in said chamber, means for imparting motion continuously to said shaft, a frame mounted for adjustment longitudinally upon said shaft, and a plurality of hover members depending from said frame.

6. In a brooder a hover chamber, a shaft mounted for rotation in said chamber, a motor connected to said shaft and operating to continuously rotate the same, a frame mounted for adjustment longitudinally of said shaft within the chamber, and a plurality of hover members depending from said frame.

7. A brooder comprising a closed hover chamber, a frame mounted for rotation in said chamber, a plurality of hover members depending from said frame, means for imparting heat to said chamber and means for continuously rotating said frame.

In testimony whereof, I affix my signature, in presence of two witnesses.

REUBEN J. LORE.

Witnesses:
　FRED. SEITZ,
　EUGENE N. LORE.